(12) United States Patent
Chapples (10) Patent No.: US 11,976,371 B2
(45) Date of Patent: May 7, 2024

(54) APPARATUS AND METHOD FOR REMOVAL OF A TARGET GAS FROM A COLD STORAGE ENVIRONMENT

(71) Applicant: HONEYWELL INTERNATIONAL INC., Charlotte, NC (US)

(72) Inventor: John Chapples, Portsmouth (GB)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 442 days.

(21) Appl. No.: 17/145,754

(22) Filed: Jan. 11, 2021

(65) Prior Publication Data

US 2021/0214854 A1    Jul. 15, 2021

(30) Foreign Application Priority Data

Jan. 14, 2020    (EP) ..................... 20151859

(51) Int. Cl.
| | | |
|---|---|---|
| C25B 15/08 | (2006.01) | |
| B01D 53/32 | (2006.01) | |
| C25B 1/02 | (2006.01) | |
| C25B 3/02 | (2006.01) | |
| C25B 3/07 | (2021.01) | |
| C25B 9/19 | (2021.01) | |
| C25B 15/023 | (2021.01) | |

(52) U.S. Cl.
CPC ............ *C25B 15/08* (2013.01); *B01D 53/326* (2013.01); *C25B 1/02* (2013.01); *C25B 3/02* (2013.01); *C25B 3/07* (2021.01); *C25B 9/19* (2021.01); *C25B 15/023* (2021.01); *B01D 2255/106* (2013.01); *B01D 2257/304* (2013.01); *B01D 2257/702* (2013.01)

(58) Field of Classification Search
CPC ............................. B01D 53/326; C25B 15/08
See application file for complete search history.

(56) References Cited

U.S. PATENT DOCUMENTS

| | | | | |
|---|---|---|---|---|
| 5,800,857 A | * | 9/1998 | Ahmad ................. | H01G 11/80 361/305 |
| 5,867,363 A | * | 2/1999 | Tsai ...................... | H01M 4/00 361/535 |

(Continued)

FOREIGN PATENT DOCUMENTS

| | | |
|---|---|---|
| CN | 203723344 U | 7/2014 |
| EP | 2853890 A1 | 4/2015 |

(Continued)

OTHER PUBLICATIONS

Fluid Analytics, LLC (2018), 2 pages. Retrieved from http://www.fluid-analytics.com/. Accessed Mar. 25, 2021.

(Continued)

*Primary Examiner* — Long T Tran
(74) *Attorney, Agent, or Firm* — Alston & Bird LLP (57) ABSTRACT

Various embodiments are directed to an improved electrochemical cell system that is configured to reduce the concentration of a target gas in a cold storage environment. The electrochemical cell system may comprise an electrochemical cell apparatus, an air circulation apparatus, and a flow hood. The electrochemical cell apparatus may be combined with or coupled to an air circulation apparatus via the flow hood to maximize access of the target gas to the gas aperture.

20 Claims, 10 Drawing Sheets

(56) References Cited

U.S. PATENT DOCUMENTS

| | | | | |
|---|---|---|---|---|
| 5,980,977 | A | * | 11/1999 | Deng ............... H01M 4/66 427/79 |
| 6,258,335 | B1 | * | 7/2001 | Bhattacharya ......... B01D 53/62 423/220 |
| 9,213,013 | B2 | | 12/2015 | Zevenbergen et al. |
| 9,480,267 | B2 | | 11/2016 | Arrigo |
| 2004/0007476 | A1 | * | 1/2004 | Tennakoon ............... C25B 1/28 205/465 |
| 2007/0295021 | A1 | * | 12/2007 | Tyls ..................... E03B 3/28 62/317 |
| 2009/0314480 | A1 | * | 12/2009 | Grinbergs ......... H01M 8/04007 429/410 |
| 2010/0116068 | A1 | * | 5/2010 | Oki ..................... G01N 1/22 239/704 |
| 2011/0233068 | A1 | | 9/2011 | Warburton |
| 2014/0338373 | A1 | | 11/2014 | Arrigo |
| 2016/0064726 | A1 | * | 3/2016 | Ikenuma ............... H01M 4/049 423/448 |
| 2017/0115035 | A1 | * | 4/2017 | Bahar .................. C09K 5/041 |
| 2020/0001230 | A1 | * | 1/2020 | Bahar ................ B01D 46/0036 |

FOREIGN PATENT DOCUMENTS

| | | |
|---|---|---|
| JP | 2012-021654 A | 2/2012 |
| KR | 10-2003-0063870 A | 7/2003 |
| WO | 01/14868 A2 | 3/2001 |
| WO | 2007/149471 A2 | 12/2007 |
| WO | 2017/091785 A1 | 6/2017 |
| WO | 2019/105428 A1 | 6/2019 |

OTHER PUBLICATIONS

Keller et al. "Ethylene Removal and Fresh Product Storage: A Challenge at the Frontiers of Chemistry. Toward an Approach by Photocatalytic Oxidation." Chem. Rev. 2013, 113, 7, 5029-5070. doi.org/10.1021/cr900398v.

European Search Report and Search Opinion Received for EP Application No. 20151859.4, dated Jul. 14, 2020, 7 pages.

EP Office Action Mailed on Feb. 1, 2024 for EP Application No. 20151859, 4 page(s).

* cited by examiner

APPARATUS AND METHOD FOR REMOVAL OF A TARGET GAS FROM A COLD STORAGE ENVIRONMENT

BACKGROUND

Gas removal technologies are commonly used to "scrub" or remove the presence of various target gases from an environment. Applicant has identified a number of deficiencies and problems associated with conventional gas removal technologies. Through applied effort, ingenuity, and innovation, many of these identified deficiencies and problems have been solved by developing solutions in accordance with the embodiments of the present disclosure, many examples of which are described in detail herein.

BRIEF SUMMARY

Various embodiments provided herein disclose improved methods, apparatuses, and systems for removing or lowering the concentration of a target gas to optimum levels in a cold storage environment.

Some embodiments are directed to an electrochemical cell system configured for reducing the concentration of a target gas in a cold storage environment comprising an electrochemical cell apparatus, comprising a housing including a gas aperture, a first electrode and a second electrode disposed within the housing, wherein the apparatus is configured to receive the target gas through the gas aperture, at least partially electrochemically oxidize the target gas upon contact with a surface of the first electrode to form one or more reaction products, and disseminate at least part of the one or more reaction products through the gas aperture, reducing the concentration of the target gas; an air circulation apparatus; and a flow hood, wherein the electrochemical cell apparatus is coupled to the air circulation apparatus via the flow hood, the flow hood defining a flow path for the target gas to flow across the gas aperture of the electrochemical cell apparatus. In some embodiments, the flow hood may be configured such that it generates a turbulent flow of the target gas through the flow hood.

In some embodiments, the flow hood is configured such that it generates a turbulent flow of the target gas through the flow hood. In still further embodiments, the flow hood comprises one or more protrusions in the flow path In some embodiments, the electrochemical cell apparatus may further comprise a third electrode. In still further embodiments, the electrochemical cell apparatus may further comprise a fourth electrode In various embodiments, the apparatus may further comprise one or more electrolyte separators disposed between the first electrode and the second electrode. In still further embodiments, the first electrode may comprise a first gas permeable membrane and a first catalyst mixture, the first electrode positioned within the housing such that the target gas passes through the gas first permeable membrane prior to reaching the first catalyst mixture. In still further embodiments, at least one of the electrodes may comprise gold or a gold alloy. In various embodiments, the target gas may comprise ethylene, hydrogen sulfide, or combinations thereof.

In some embodiments, the air circulation apparatus may be a fan. In other embodiments, the air circulation apparatus may be a pump.

In various embodiments, the electrochemical cell system may further comprise an electronic circuit configured to measure a current generated by the electrochemical cell apparatus. In still further embodiments, the air circulation apparatus may be configured such that it is activated when the current generated by the electrochemical cell apparatus satisfies a predetermined threshold. In certain embodiments, the electrochemical cell system may further comprise a timer, wherein the air circulation apparatus may be configured such that it is activated upon expiration of a defined period of time measured by the timer.

In still further embodiments, the electrochemical cell system may further comprise a high surface area carbon filter.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

Having thus described some embodiments in general terms, reference will now be made to the accompanying drawings, which are not necessarily drawn to scale, and wherein:

DETAILED DESCRIPTION

The present disclosure more fully describes various embodiments hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used herein is not meant to be limiting insofar as devices or apparatuses described herein, or portions thereof, may be attached or utilized in other orientations.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Overview

Ethylene has been identified as a plant hormone and is known to generate significant effects on the physiology of plants throughout the plant life cycle. In cold storage environments, such as refrigerated trucks, refrigerated train cars, and refrigerated reefers or shipping containers, which are often used in the post-harvest and distribution of many horticultural products, the presence of ethylene, even in low concentrations, is generally viewed as being detrimental to the quality and longevity of such horticultural products.

The removal of ethylene from cold storage environments to ensure fruit, vegetable, and floral freshness has proven difficult and prior art filters and systems used in the elimination of ethylene are often ineffective, require frequent replacement, incur increased costs, and/or involve hazardous materials. For example, applications relying on simple ventilation methods lead to increased running costs, applications utilizing potassium permanganate require frequent replacement and hazardous waste disposal, applications utilizing ultraviolet radiation and/or ozone (e.g., corona discharge systems) require maintenance and involve potential toxic exposure, and applications relying on physical adsorbents require frequent replacement. For at least these reasons, it is desirable to efficiently lower the concentrations of ethylene present in cold storage environments without incurring recurring costs or significant exposure risks, especially in domestic applications, i.e., consumer or residential cold storage appliances such as refrigerators.

Various example embodiments of the disclosure are directed to systems, methods, and devices that are configured to provide improved target gas removal using an electrochemical cell apparatus. As discussed herein, Applicant has identified that providing an electrochemical cell apparatus according to various example embodiments disclosed herein facilitates the electrochemical oxidation of a target gas, thereby reducing the concentration of the target gas in the identified environment without incurring ongoing maintenance or replacement costs and without risk of exposure to hazardous waste or toxic gases.

Example Apparatuses for Implementing Various Embodiments

Figure 1A:
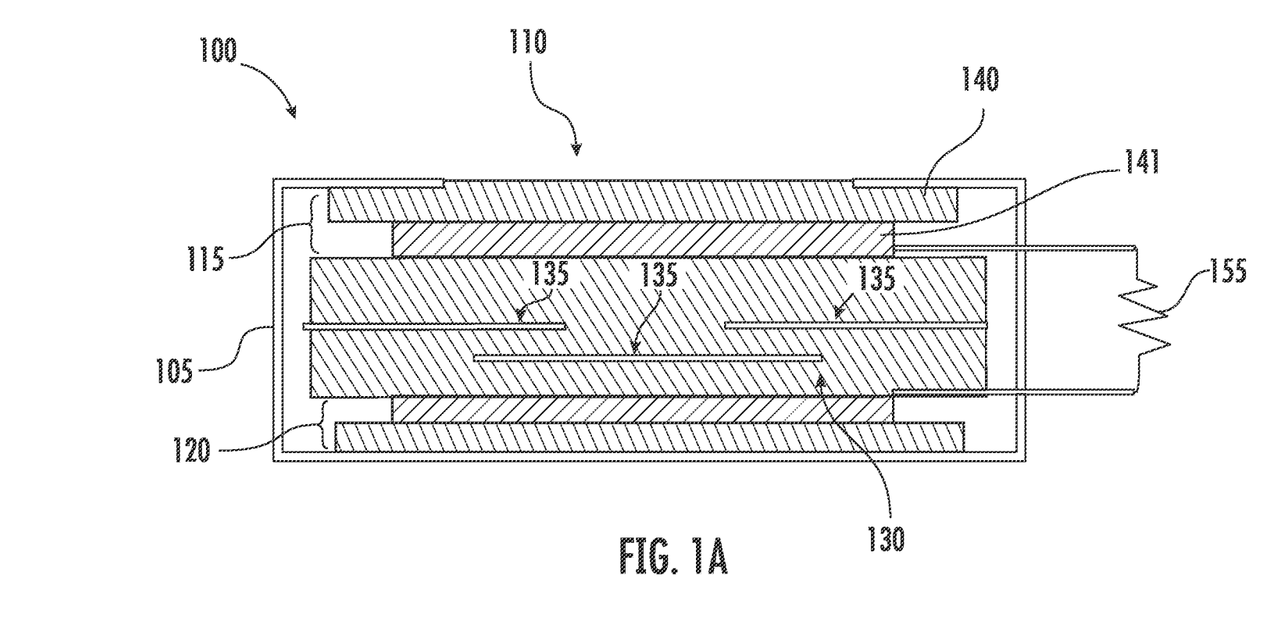
FIG. 1A illustrates a cross-sectional schematic view of an exemplary apparatus structured in accordance with various embodiments disclosed herein.

The electrochemical cell apparatuses disclosed herein may be in any suitable form. FIG. 1A depicts a cross-sectional schematic drawing of an exemplary electrochemical cell apparatus 100 structured in accordance with various embodiments. In the illustrated embodiment, the apparatus 100 comprises a housing 105 having a gas aperture 110, where gas, such as a target gas, may enter the apparatus 100. The housing is formed of any chemically compatible material, such as plastics, metals, and ceramics. In certain embodiments, the housing is plastic.

Figure 1B:
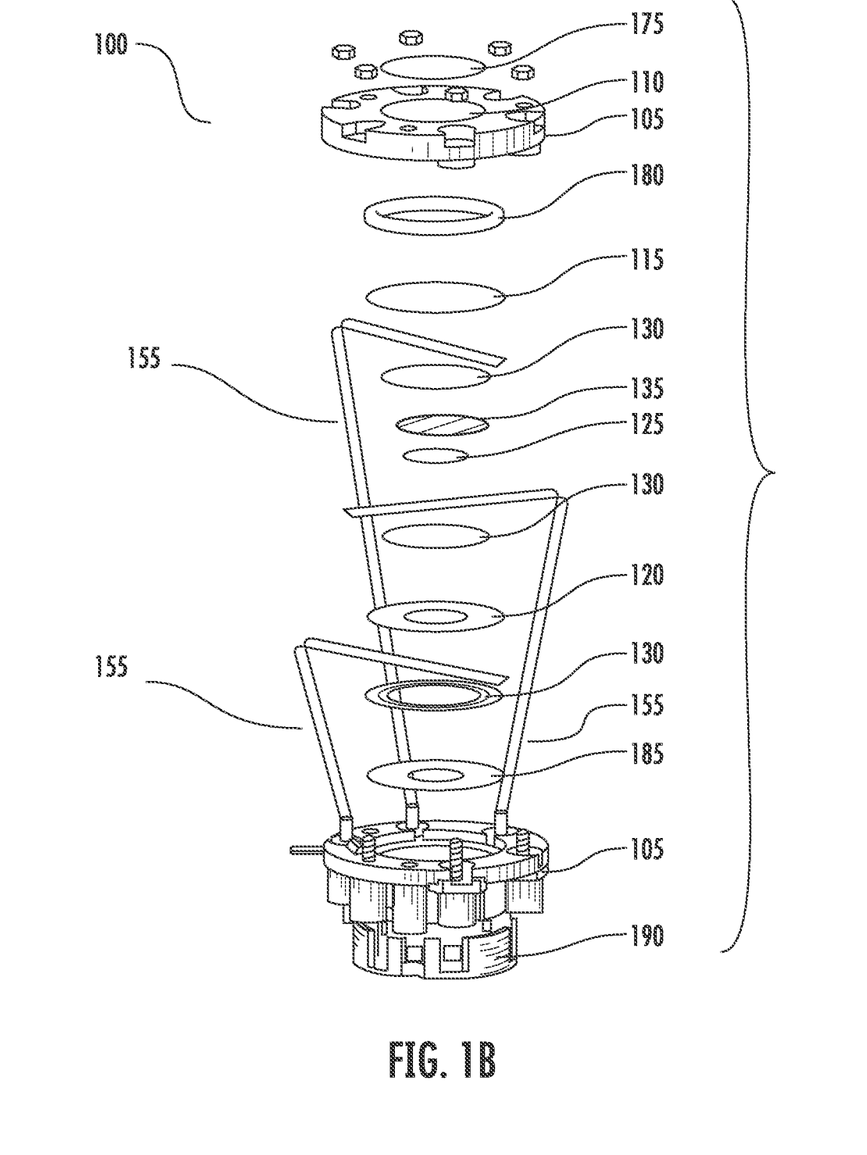
FIG. 1B illustrates a schematic view of an exemplary apparatus structured in accordance with various embodiments disclosed herein.

In the embodiment depicted in FIG. 1A, the apparatus 100 comprises two electrodes, including a working electrode 115 and a counter electrode 120. In such an embodiment, the counter electrode 120 operates as both a counter electrode and reference electrode, i.e., a counter/reference electrode 120. Alternatively or additionally, in some embodiments, such as depicted in FIG. 1B, the apparatus 100 comprises three electrodes, including the working electrode 115, the counter electrode 120, and a separate reference electrode 125. The location of the reference electrode 125 can be in the center of the electrochemical cell stack as shown, or interchanged with the counter electrode 120.

In various embodiments, the electrodes are electrically connected to each other by one or more electrical connections 155. For example, in the two-electrode embodiment depicted in FIG. 1A, the electrodes 115, 120 are electrically connected to each other by the electrical connection 155. In some embodiments, the one or more electrical connections 155 are chemically and electrochemically inert under the operating conditions of the electrochemical cell apparatus 100. In certain embodiments, an electrical connection 155 is made of platinum. In other embodiments, an electrical connection 155 is made of tantalum.

One or more electrolyte separators 130 are disposed between the electrodes. For example, in a two-electrode embodiment as depicted in FIG. 1A, the working electrode 115 is in contact with a first surface of the electrolyte separator 130 and the counter/reference electrode 120 is in contact with a second surface of the electrolyte separator 130. In a non-limiting exemplary three-electrode embodiment as depicted in FIG. 1B, the working electrode 115 is in contact with a first electrolyte separator 130, the first electrolyte separator 130 is further in contact with a cross-over barrier 135, the cross-over barrier 135 is further in contact with the reference electrode 125, the reference electrode 125 is further in contact with a second electrolyte separator 130, the second electrolyte separator 130 is further in contact with the counter electrode 120, and the counter electrode is further in contact with a third electrolyte separator. The one or more electrolyte separators 130 comprise an ionically conducting electrolyte retained in a porous substrate material, i.e., the porous substrate material may become saturated with the electrolyte in order to accommodate ion transfer therebetween. Common electrolytes may be employed, including soluble salts, acids (e.g., sulfuric acid, phosphoric acid), bases or the like, depending on the target gas of interest. According to various embodiments described herein, sulfuric acid is employed. The porous substrate material may comprise nonwoven materials, woven materials, polymer films, or the like. In some embodiments, the porous substrate material is formed of glass fibres.

In some embodiments, one or more cross-over barriers 135 may be interspersed within the one or more electrolyte separators 130. Although the one or more electrolyte separators 130 provide a gas barrier between the electrodes 115, 120, 125, the one or more cross-over barriers 135 are optionally included in order to provide an additional impediment to prevent the target gas from reaching the counter/reference electrode 120 in a two-electrode embodiment, and from reaching the counter electrode 120 and reference electrode 125 in a three-electrode embodiment. That is, the one or more cross-over barriers 135 are configured such that they make the path between the working electrode 115, on the one hand, and the counter/reference electrode 120 (or counter electrode 120 and reference electrode 125 in a three-electrode embodiment), on the other hand, more tortuous in order to restrict access of any reaction products from the electrochemical oxidation of the target gas from reaching the counter/reference electrode 120 (and the counter electrode 120 and reference electrode 125 in a three-electrode embodiment). In some embodiments, the cross-over barriers are formed of a chemically inert polymeric film, such as a polyvinylidene chloride (PVDC) film or a poly-chloro-trifluoro-ethylene (PCTFE).

Returning to FIG. 1A, the working electrode 115 comprises a first gas permeable membrane 140 and an electrode catalyst mixture 141, wherein the first gas permeable membrane 140 is disposed between the gas aperture 110 and the catalyst mixture 141. In some embodiments, the first gas permeable membrane 140 comprises a porous hydrophobic substrate to support the electrode catalyst mixture 141 in forming the electrode(s), as described in more detail below. The porous hydrophobic substrate allows the target gas to access to the electrode catalyst mixture 141 through the first gas permeable membrane 140. In certain embodiments, the gas permeable hydrophobic substrate comprises microporous polytetrafluoroethylene (PTFE). Each of the electrodes may comprise such a gas permeable membrane and an electrode catalyst mixture.

The materials and construction of the electrodes may vary based on the specific species of target gas to be eliminated from the environment. That is, the electrodes can comprise a reactive material suitable for facilitating the electrochemical oxidation of a target gas when maintained at an appropriate electrode potential. For example, the electrodes may comprise one or more materials, such as platinum, palladium, iridium, rhodium, ruthenium, gold, silver, carbon, combinations thereof, oxides thereof and/or alloys thereof. As a non-limiting exemplary example, in a domestic cold storage application where ethylene is the target gas, gold or a gold alloy may be a preferred electrode catalyst mixture 141 such that the working electrode 115 reacts with the intended ethylene gas while remaining insensitive to other environmental gases, such as carbon monoxide. The individual electrodes may be of the same material or different materials. For example, in some embodiments, all electrodes are formed of the same materials. In other embodiments, the electrodes are formed of different materials.

According to various embodiments, each of the electrodes 115, 120, 125 are fabricated from the deposition of an electrode catalyst mixture, such as high surface area precious metal catalyst particles intimately mixed with a binder, such as PTFE particles, onto a gas permeable membranes. For example, the working electrode 115 may be fabricated by depositing an electrode catalyst mixture 141 comprising a high surface area precious metal catalyst onto the first gas permeable membrane 140. In certain embodiments, the above-described depositions may be accomplished using any suitable deposition methodologies, including but not limited to electrochemical deposition, spray deposition, vacuum deposition, wet chemistry deposition, screen printing, and the like, or combinations thereof.

In some embodiments, the thickness of the deposited electrode catalyst mixture can be varied in order to provide improved properties to one or more of the electrodes. For example, one electrode may contain a heavier or thicker deposition of the catalyst as compared to the other electrode(s). According to various two-electrode embodiments, as depicted in FIG. 1A, the working electrode 115 and the counter electrode 120 are electrically shorted together and the working electrode potential is determined by a "mixed potential" of both the working electrode 115 and the counter electrode 120. In order to impart long-term stability and to minimize electrode polarization when the electrochemical cell apparatus 100 is actively removing the target gas from the environment in such embodiments, in some examples, the counter electrode 120 may be formed by depositing one thicker layer or multiple layers of the electrode catalyst mixture resulting in a thicker layer of the catalyst (as compared to the thickness of the electrode catalyst mixture 141 in the working electrode 115).

In various embodiments, the electrochemical cell apparatus 100 may optionally comprise one or more dust membranes 175, as depicted in FIG. 1B. A dust membrane 175 may be desired to reduce the exposure of the electrochemical cell apparatus to dust particles and other physical contaminants. In still further embodiments, the electrochemical cell apparatus 100 may comprise one or more seals, such as an O-ring 180 or a PTFE seal 185. In certain embodiments, a coloured identification ring 190 may be provided to identify the target gas detected by the electrochemical cell apparatus.

The electrochemical cell apparatuses disclosed herein may be positioned in any environment where one or more target gases are present and desired to be removed, such as in a domestic or consumer appliance (e.g., a household refrigerator). Although examples disclosed herein generally are described in connection with cold storage environments and horticulture applications, one of ordinary skill in the art would understand and it should be understood that, the applicability of the disclosed systems, methods, and apparatuses are inclusive of a wide variety of environments and applications, including, but not limited to, consumer, commercial, aeronautical, medical, industrial, manufacturing, refineries, agricultural, governmental, and the like.

Target gases may include one or more gases that are desired to be removed from, or their concentrations controlled in, an environment by the electrochemical cell apparatus. The electrochemical cell apparatus may be used to oxidize a single target gas, two target gases, or a plurality of target gases. For instance, the target gas may include ethylene, carbon monoxide, or hydrogen sulfide, or combinations thereof. One or more electrochemical cell apparatuses, such as a plurality of electrochemical cell apparatuses, may be used in combination, each formulated to detect a certain target gas or the same target gas.

Referring to FIGS. 1A and 1B, in some embodiments and during operations, the target gas is introduced to the electrochemical cell apparatus 100 as it passes over and through the gas aperture 110 of the housing 105, where the target gas continues to diffuse through the first gas permeable membrane 140 of the working electrode 115 before reaching the surface of the electrode catalyst mixture 141. At the working electrode 115, the target gas is electrochemically oxidized. In a non-limiting exemplary example, the electrode catalyst mixture 141 of the working electrode 115 comprises platinum and the target gas is ethylene which is electrochemically oxidized into a mixture of reaction products including carbon dioxide, ethanol, acetic acid, and a variety of other products. In some embodiments, the reaction products exit the electrochemical cell apparatus 100 through the first gas permeable membrane 140 and the gas aperture 110 of the housing 105. In other embodiments, one or more of the reaction products are soluble to varying degrees in the electrolyte of the electrolyte separator 130. In a non-limiting exemplary example wherein the target gas is ethylene, carbon dioxide may exit through the gas aperture 110, while ethanol, acetic acid, and a variety of other reaction products may be soluble in the electrolyte of the electrolyte separator 130.

Current generated during the electrochemical oxidation flows through the electrical connection 155 to maintain electroneutrality between the electrodes 115, 120. In such an embodiment, the electrochemical cell apparatus is active and continues to remove any gas that reaches the electrode catalyst mixture 141 surface of the working electrode 115 and is capable of being electrochemically oxidized. In the depicted embodiment, there is no need for any power supply or electrical circuit. The simplicity of the depicted embodiment and lack of toxic substances and hazardous waste that some existing gas removal technologies require, makes it attractive for cold storage applications, but particularly suited for consumer or residential cold storage applications. In some embodiments, the depicted implementation is positioned in a domestic or residential refrigerator, wherein the refrigerator comprises a device for circulating air within the cold storage compartment.

In the above described non-limiting exemplary electrochemical cell apparatus, wherein ethylene is the target gas, the electrochemical cell apparatus as described herein can sufficiently remove the target ethylene gas at a faster rate (e.g., rate of consumption), in some examples, than the rate at which the food and/or horticultural products are able to generate ethylene (e.g., rate of decomposition). A limitation to the rate of consumption of the target gas is natural convection within the storage compartment. That is, the target gas may be generated by the horticultural products, but not sufficiently distributed throughout the storage compartment to make contact with the electrochemical cell apparatus in order to be electrochemically oxidized. Thus, to enhance the efficacy of the electrochemical cell apparatuses, some embodiments disclosed herein utilize forced convection. According to various embodiments, an electrochemical cell apparatus as described herein is disposed in relation to one or more air circulation apparatuses, such as a pump, fan, blower, suction device, and the like. In one embodiment, an air circulation apparatus is disposed remote to the electrochemical cell apparatus. In such an embodiment, the air circulation apparatus may be powered independently by the refrigeration unit or by a battery source.

In another embodiment, an air circulation apparatus is disposed proximate to electrochemical cell apparatus and is coupled to the apparatus via one or more conduits, such as tubing and the like. For example, the air circulation apparatus may be directly attached to the apparatus using tubing. In such an embodiment, the air circulation apparatus may be powered independently by the refrigeration unit or by a battery source.

Figure 2A:
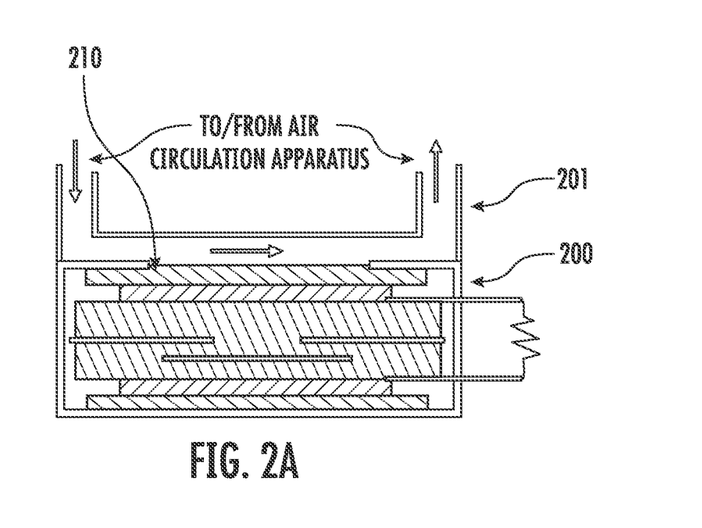
FIG. 2A depicts a cross-sectional schematic drawing of an exemplary electrochemical cell apparatus structured in accordance with various embodiments disclosed herein.
Figure 2B:
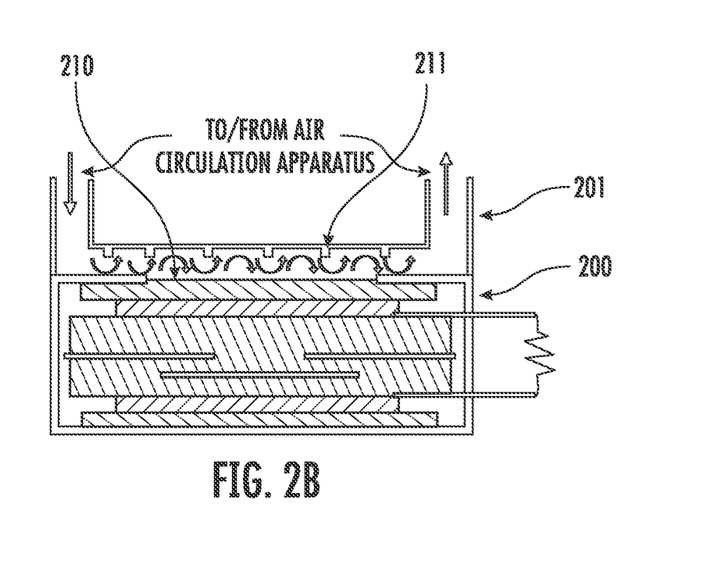
FIG. 2B depicts a cross-sectional schematic drawing of an exemplary electrochemical cell apparatus structured in accordance with various embodiments.

In still a further embodiment, the electrochemical cell apparatus and air circulation apparatus are configured such that they operate as a standalone system. FIG. 2A depicts a cross-sectional schematic drawing of an exemplary electrochemical cell apparatus 200 structured in accordance with various embodiments. In the illustrated embodiment, the air circulation apparatus (not pictured) is coupled to the apparatus via a flow housing or flow hood 201. The flow housing or flow hood 201 is configured such that it generates a turbulent flow of gas (i.e., air comprising a target gas) across the gas aperture 210, as depicted by the arrows in FIG. 2A. In some embodiments, as illustrated in FIG. 2B, the flow housing or flow hood 201 comprises one or more protrusions 211, such as ribs, in the flow path to generate the turbulent flow. Such turbulent flow is configured to maximize the access of the target gas through the gas aperture 210 and increase the target gas removal efficiency of the electrochemical cell apparatus 200 (i.e, increase the rate of consumption) as compared to diffusion of the target gas through the gas aperture 110 or a laminar flow. In various embodiments, the flow housing or flow hood 201 is constructed of one or more materials that can be machined or molded. In some embodiments, the flow housing or flow hood 201 is constructed of plastic. In various embodiments, the flow housing or flow hood 201 is constructed of molded ceramic. In some embodiments, the flow housing or flow hood 201 comprises metal. In such embodiments, direct metal surfaces may be avoided to avoid the promotion of condensation in the flow hood 201 or gas aperture 210.

Figure 3A:
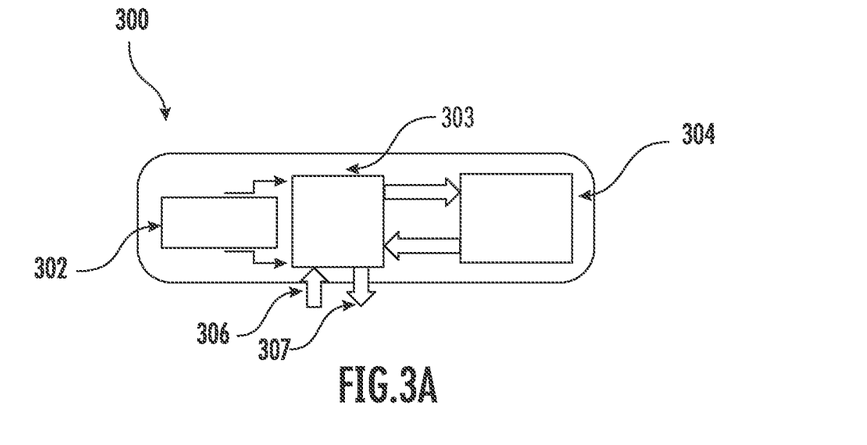
FIG. 3A depicts a schematic drawing of an exemplary electrochemical cell system structured in accordance with various embodiments disclosed herein.

FIG. 3A depicts a schematic drawing of an exemplary electrochemical cell system 300 structured in accordance with various embodiments. In some embodiments, the standalone electrochemical cell system 300 comprising an air circulation apparatus 303 and an electrochemical cell apparatus 304 would further comprise an independent source of power 302, such as a rechargeable battery source, electrically connected to the air circulation apparatus 303. In some embodiments, the overall size of the electrochemical cell system would be configured such that it would readily fit into a refrigeration compartment of a domestic refrigeration unit. As depicted in FIG. 3A, in some embodiments, the air circulation apparatus 303, such as a pump, comprises one or more inlets 306 and one or more outlets 307 in connection with the refrigeration compartment such that it recirculates the air within the refrigeration compartment. In another embodiment, the air circulation apparatus 303, such as a small fan, is interfaced directly to the electrochemical cell apparatus 304 such that the electrochemical cell apparatus 304 and air circulation apparatus 303 operate as a standalone electrochemical cell system 300.

In various embodiments, the air circulation apparatus 303 is configured to run continuously. That is, the air circulation apparatus 303 continuously circulates air in the environment and through the gas aperture of the electrochemical cell apparatus. In some embodiments, the air circulation apparatus 303 is configured to operate intermittently for a sufficient period of time such that the air in the refrigerated compartment would be recirculated several times over.

Figure 3B:
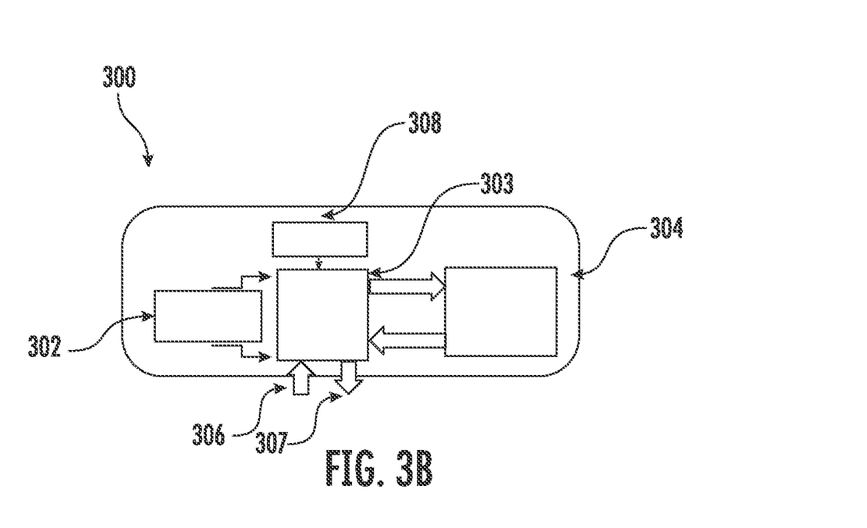
FIG. 3B depicts a schematic drawing of an exemplary electrochemical cell system structured in accordance with various embodiments disclosed herein.

In some embodiments, the activation of the air circulation apparatus 303 is triggered by an event or occurrence. For example, FIG. 3B depicts a schematic drawing of an exemplary electrochemical cell system 300 structured in accordance with various embodiments. In the depicted embodiment, the standalone electrochemical cell system 300 comprises, or otherwise is associated with, a timer 308 to control the power cycle and frequency of operation of the air circulation apparatus 303. Upon expiration of a defined period of time, the air circulation apparatus 303 is configured to activate. The power cycle (i.e, ON-OFF cycle) and frequency of operation would depend on the type and capacity of the air circulation apparatus as well as the volume of the refrigerated compartment, whereby such time and frequency conditions can be pre-determined by the skilled person with some routine experimentation. Additionally or alternatively, in certain embodiments, the air circulation apparatus 303 is configured such that it is activated (i.e., turned on) upon opening of the refrigeration compartment and/or a door to the refrigerator. In some embodiments, the refrigerator door may be associated with the electrochemical cell system 300 and/or the air circulation apparatus 303 such that the activation event (e.g. opening the door) generates a signal that is transmitted to the air circulation apparatus 303.

In such embodiments, the configuration of the air circulation apparatus 303 does not require detection of or any measurement of a sample gas in order to initiate activation. That is, in some embodiments, the air circulation apparatus 303 may be activated and recirculating air in some embodiments even in instances where target gases are not present in the cold storage environment.

Figure 4:
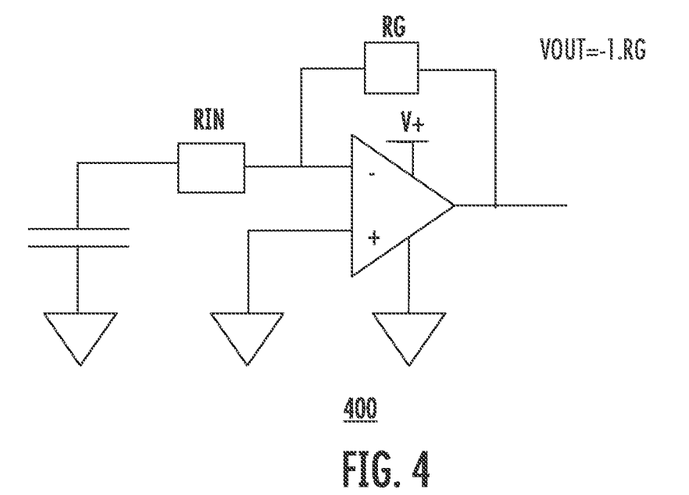
FIG. 4 depicts a schematic drawing of an exemplary electronic circuit that can be used to measure current generated by an electrochemical cell apparatus structured in accordance with various embodiments disclosed herein disclosed herein.

In various embodiments, the air circulation apparatus 303, the electrochemical cell system 300, and/or the electrochemical cell apparatus 100, 200, 304 may be configured such that the air circulation apparatus 303 is subject to active control (as opposed to passive control as described with respect to various embodiments herein). Accordingly, it may be desirable to save energy and operate the air circulation apparatus 303 in instances where target gases are present and require removal. In some embodiments, the electrochemical cell apparatus 100, 200, 304 comprises an electronic circuit 400 such that it measures the current generated by the electrooxidation of target gases in the electrochemical cell apparatus 100, 200, 304. FIG. 4 depicts a schematic drawing of an exemplary electronic circuit 400 that can be used to measure current generated by an electrochemical cell apparatus structured in accordance with various embodiments. In still further embodiments, the air circulation apparatus 303 is configured such that it is activated when the current generated by the electrochemical cell apparatus 100, 200, 304 satisfies (i.e., exceeds) a predetermined threshold. In such embodiments, the electrochemical cell apparatus detects the target gas in addition to removing the target gas, eliminating the need for additional hardware.

Such predetermined threshold(s) can be determined in a myriad of ways, depending on the importance of minimizing the presence of unwanted gases compared to reducing operation of the air circulation apparatus 303 (i.e. conserving energy). For example, in some embodiments, the predetermined threshold is defined as the level of the highest apparent gas concentration expected to be found when replicates of a sample gas containing no target gas analyte are tested. This value is commonly referred to as the "limit of blank (LOB)" and is estimated from experimentation by measuring replicates of a blank sample gas and calculating the mean result and the standard deviation (SD), given by the following equation (1):

$$LOB = \text{meanblank} + 1.645(SD\text{blank}) \quad (1)$$

Setting the predetermined threshold at the LOB maintains the lowest levels of unwanted gas at the risk of operating the air circulation apparatus 303 when the target gas is not necessarily present.

Additionally or alternatively, in various embodiments, the predetermined threshold is defined as the limit of detection (LOD), according to the following equation (2):

$$LOD = LOB + 1.645(SD\text{low concentration sample}) \quad (2)$$

where the "SDlow concentration" is determined from replicate measurements on target gases at or close to the lowest concentration of interest.

In some embodiments, the electrochemical cell apparatus does not distinguish between the detection of the target gas and other electroactive gases. That is, the current generated by the electrochemical cell apparatus indicates detection of the presence of at least one unwanted electroactive gas (i.e., not necessarily the target gas) in the refrigerated compartment. For example, in a non-limiting exemplary example, in a domestic cold storage application where ethylene is the target gas and the electrode catalyst mixture 141 of the working electrode 115 comprises platinum, the electrochemical cell apparatus will "scrub" or remove any electroactive gas that can be electrochemically oxidized at the surface of the platinum working electrode 115, not just the target ethylene gas. In many household environments, ambient concentrations of other electroactive gases that are capable of being oxidized by platinum, such as carbon monoxide, are likely to be present at concentrations between about 100 to about 1000 times the maximum desirable concentration of ethylene. In such embodiments, the electrochemical cell apparatus may generate a current greater than a predetermined threshold (e.g., LOB, LOD, etc). Accordingly, in some embodiments wherein an associated air circulation apparatus relies on feedback from the current readings of electrochemical cell apparatus, the current generated by the electrochemical cell apparatus is sufficient to activate the air circulation apparatus such that the intended target gas is removed from the environment (i.e., concentration of target gas is reduced), however, it is possible that the air circulation apparatus would be continuously activated.

For purposes of illustration only and not of limitation, several of the embodiments described herein refer to the two-electrode embodiment with a working electrode 115 and a counter electrode 120, wherein the counter electrode 120 functions as a combined counter/reference electrode 120. In alternative three-electrode embodiments, comprising a working electrode 115, a counter electrode 120, and a reference electrode 125, the working electrode 115 may be operated at potentials other than 0.0V versus the reference electrode 125. That is, various embodiments comprising three electrodes can be operated at different voltages. In some embodiments, the working electrode 115 may be configured to operate at the optimum voltage (versus the reference electrode 125) to facilitate the most rapid consumption of a target gas. For example, in a non-limiting exemplary example, where the reference electrode 125 comprises platinum, the voltage of operation would be between about 0-300 mV more anodic, preferably between about 250-300 mV. In such embodiments, the upper limit of the voltage of operation is limited by the onset of evolution of oxygen from electrolyte decomposition. In various embodiments comprising three or more electrodes, a potentiostatic circuit, such as that commonly employed in the electrochemistry industry, may be employed with the electrochemical cell apparatus.

In some embodiments, it is desired that the electrochemical cell apparatus distinguish between the detection of the target gas and other electroactive gases in order to avoid continuous activation of an associated air circulation apparatus. That is, in various embodiments wherein the current generated by the electrochemical cell apparatus provides feedback to the air circulation apparatus, it may be desirable that the current generated indicate the electrochemical cell apparatus's response to the target gas, not the target gas and other electroactive gases. For example, in a non-limiting exemplary example, in a domestic cold storage application where ethylene is the target gas, gold or a gold alloy may be a preferred catalyst such that the working electrode 115 selectively reacts with the intended ethylene gas while remaining insensitive to other environmental gases, such as carbon monoxide.

Figure 5:
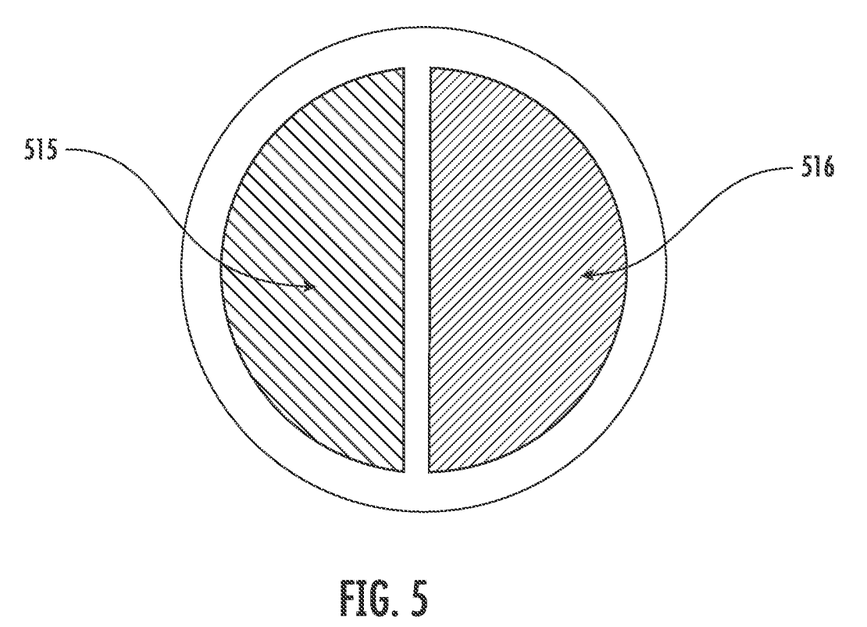
FIG. 5 illustrates a schematic drawing of two working electrodes structured in accordance with one embodiment disclosed herein.
Figure 6:
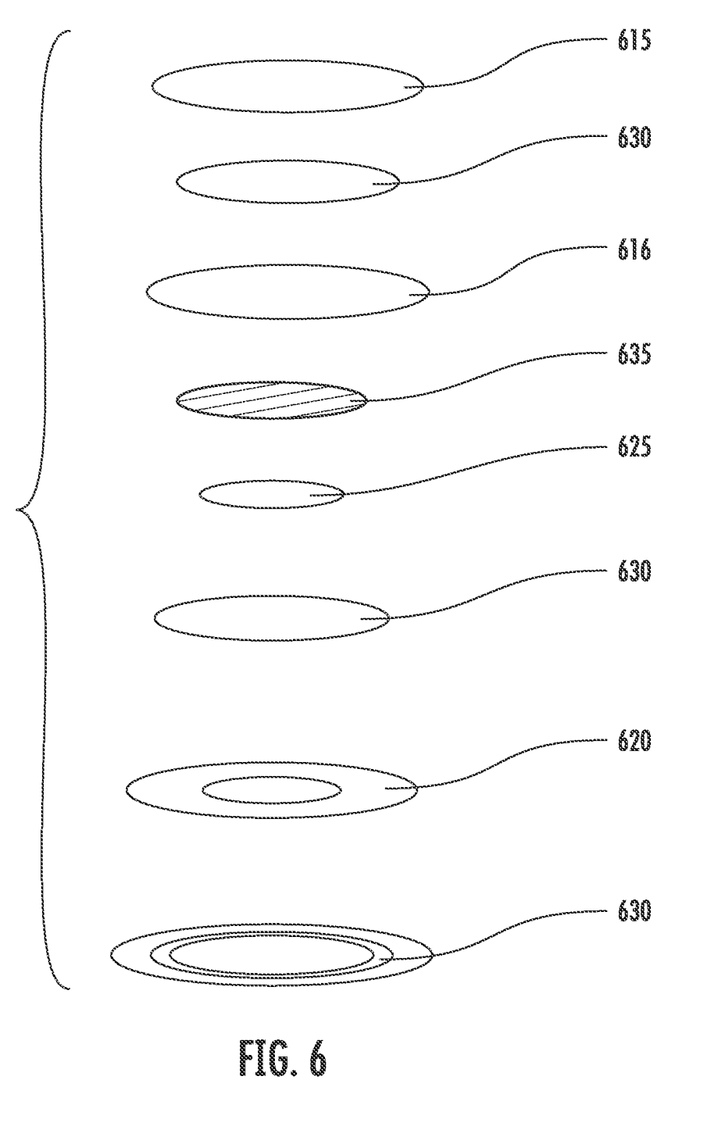
FIG. 6 illustrates a schematic drawing of two working electrodes structured in accordance with one embodiment disclosed herein.

In various embodiments, the electrochemical cell apparatus comprises four electrodes, including a first working electrode, a second working electrode, a reference electrode, and a counter electrode. The second working electrode is chosen such that it is unreactive to the target gas(es) of interest and other potential cross interferents (e.g. such as carbon monoxide when the target gas is ethylene). In such embodiments, the measurement of the current on a first working electrode can be compared to the measurement of the current on the second working electrode, and the resulting difference in response can be attributed to the presence of a target gas. In some embodiments, the first working electrode and the second working electrode share a gas permeable membrane. That is, a first electrode catalyst mixture 515 is applied to a portion of one side of a gas permeable membrane and a second electrode catalyst mixture 516 is applied to the remaining portion (subject to a separation of the catalyst mixtures) of the same side of the gas permeable membrane, as depicted in FIG. 5. In other embodiments, the second working electrode 616 may be disposed between the first working electrode 615, and a crossover barrier 635, as depicted in FIG. 6. Various different combinations of working electrode catalysts are possible and contemplated by this disclosure. For purposes of illustration and not of limitation, the first working electrode may comprise platinum and the second working electrode may comprise gold. The choice of catalyst mixture for each working electrode is chosen to maximize the gas response to the desired target gas.

Figure 7A:
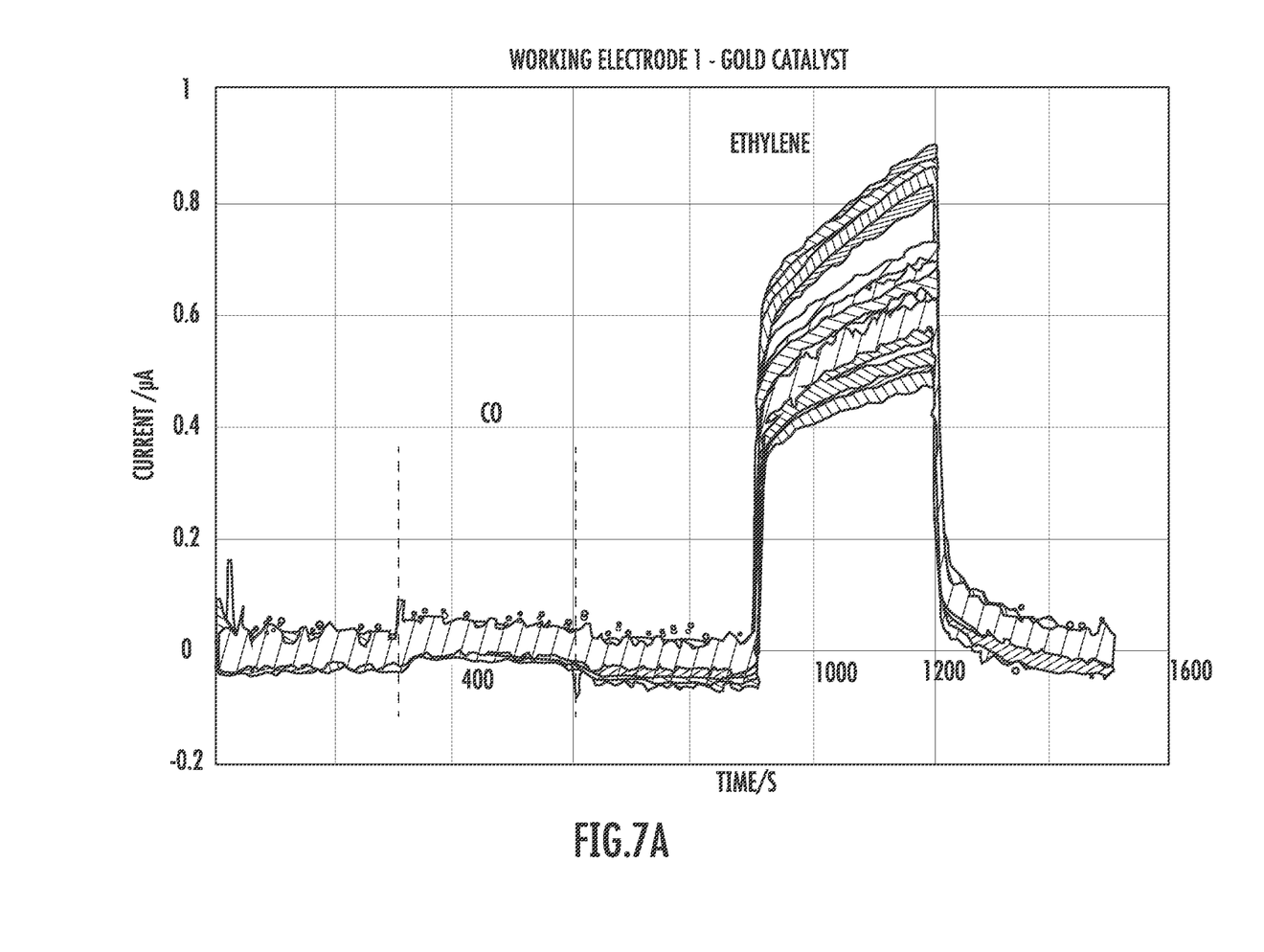
FIG. 7A illustrates current readings from an exemplary electrochemical cell apparatus in accordance with various embodiments disclosed herein.
Figure 7B:
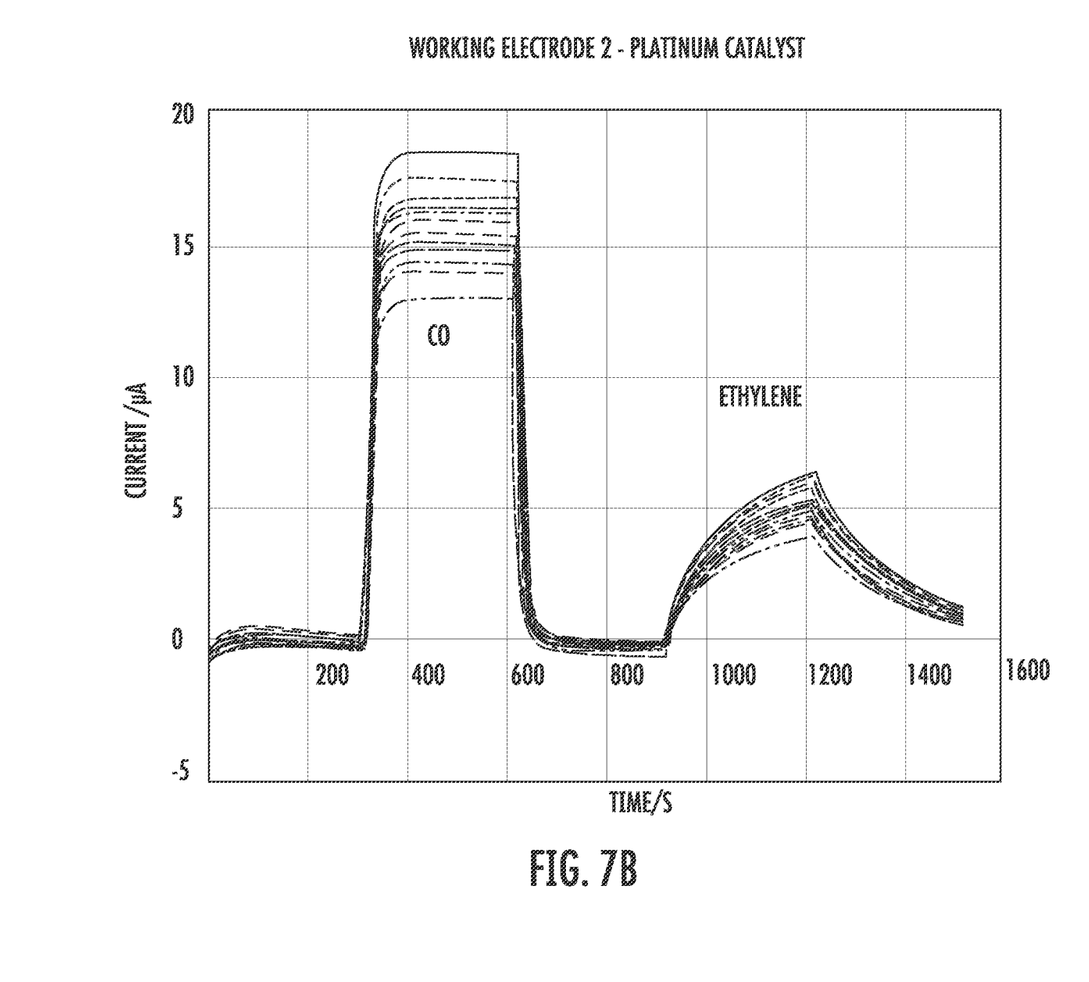
FIG. 7B illustrates current readings from an exemplary electrochemical cell apparatus in accordance with various embodiments disclosed herein.

Exemplary electrochemical cell apparatuses in accordance with various embodiments described herein are illustrated in FIGS. 7A and 7B. Specifically, without being limited hereto, FIGS. 7A and 7B illustrate current readings from an exemplary experimental electrochemical cell apparatus as depicted in FIG. 6, elucidating the response of a first working electrode 615 comprising a gold catalyst and a second working electrode 616 comprising a platinum catalyst to a mixture of carbon monoxide and ethylene. FIG. 7A illustrates that the first working electrode 615 comprising a gold catalyst is largely specific towards ethylene, whereas FIG. 7B illustrates that the second working electrode 616 comprising a platinum catalyst responds to both gases. In such an implementation, an associated air circulation apparatus (not depicted) would be activated only when a response was measured on the first working electrode 615 (gold), indicating the presence of the target gas ethylene. FIGS. 7A and 7B also illustrate that ethylene generated a simultaneous response on both the first and second working electrodes. Accordingly, various embodiments including two working electrodes in such configuration may be considered to effect a more efficient removal of the target gas compared to an electrochemical cell apparatus containing only one working electrode. In some embodiments, such configuration allows compensation for transient changes in environmental conditions, such as temperature and humidity, that may otherwise be falsely interpreted as being caused by the presence of an unwanted gas and long-term drift in the baseline over time.

Figure 8A:
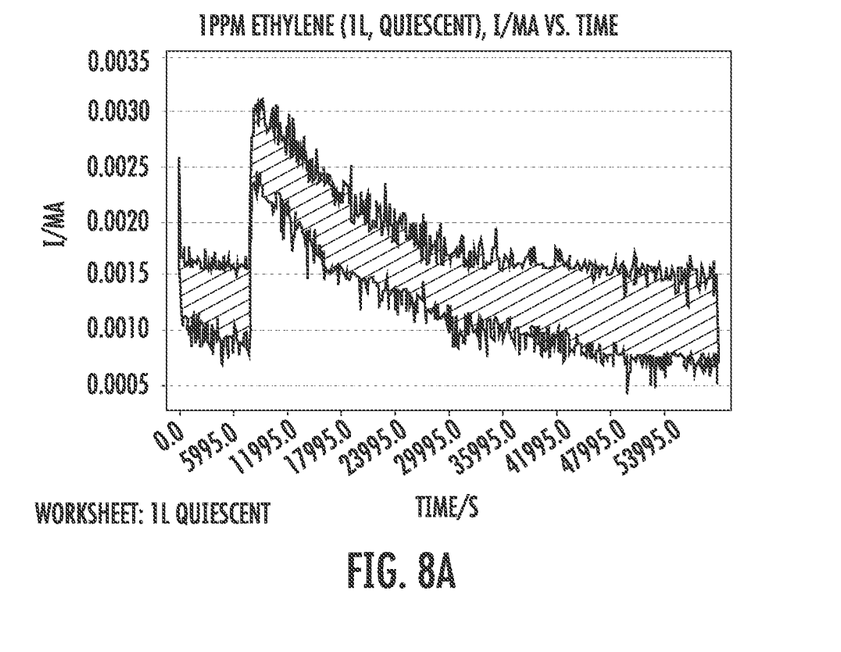
FIG. 8A illustrates current readings from an exemplary electrochemical cell apparatus in accordance with various embodiments disclosed herein.
Figure 8B:
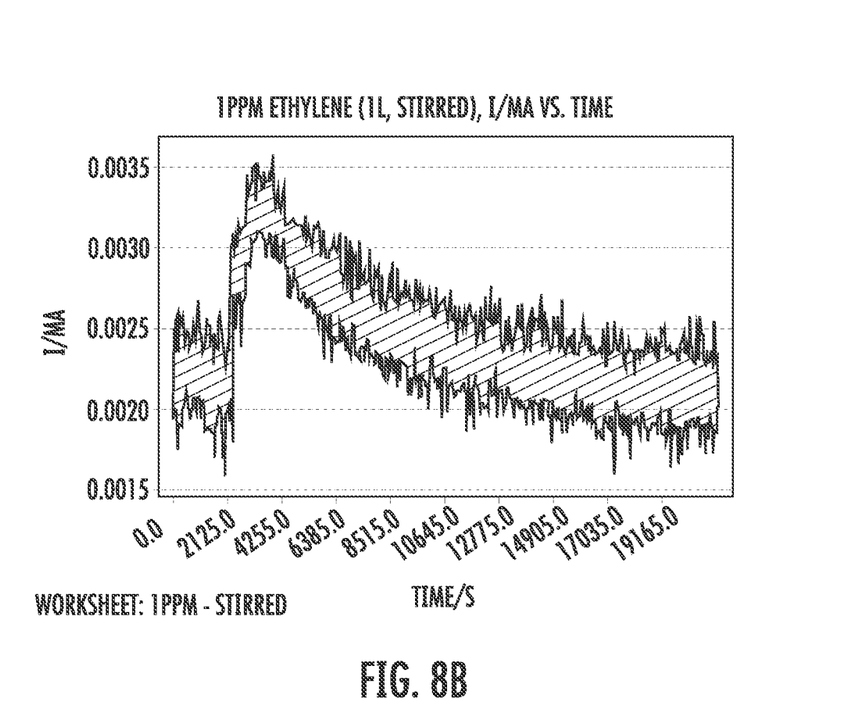
FIG. 8B illustrates current readings from an exemplary electrochemical cell apparatus in accordance with various embodiments disclosed herein.

Exemplary electrochemical cell apparatuses in accordance with various embodiments described herein are illustrated in FIGS. 8A and 8B. Specifically, without being limited hereto, FIGS. 8A and 8B illustrate current readings from exemplary experimental electrochemical cell apparatuses elucidating the effectiveness of various embodiments described herein. FIGS. 8A and 8B illustrate the current readings over time (measured in seconds) of an electrochemical cell apparatus with three electrodes in accordance with various embodiments described herein placed within a sealed 1L container initially filled with air and then 1 ppm ethylene is added. That is, in FIG. 8A, for example, from time 0 to approximately 5995 seconds, the "zero" reading corresponds to the presence of air only. At approximately 5995 seconds, 1 ppm ethylene is added to the container forming an ethylene/air mixture, causing the rise in the current readings. FIG. 8B demonstrates a similar "zero" reading followed by addition of 1 ppm ethylene. FIG. 8A illustrates current readings in a quiescent environment. FIG. 8B illustrates current readings in a container wherein the air/ethylene gas mixture was circulated via a small fan placed in the container in a position remote from the electrochemical cell apparatus. As shown, FIG. 8B elucidates the increased effectiveness of incorporating an air circulation apparatus and/or turbulent flow of air, thereby increasing the gas flow through the gas aperture of the electrochemical cell apparatus.

Additionally or alternatively, in various embodiments, the air circulation apparatus 303, the electrochemical cell system 300, and/or the electrochemical cell apparatus 100, 200, 304 may comprise a filter. In some embodiments, a filter, such as a high surface area (HSA) carbon filter, removes potential catalyst poisons. For example, although HSA carbon filters are not efficient in the removal of ethylene from an environment, HSA filters adsorb gases such as hydrogen sulfide and many organic contaminants. In some embodiments, one or more filters are positioned in the flow of the air comprising the target gas prior to the air coming into contact with the gas aperture 110 of the electrochemical cell apparatus 100, 200, 304. For example, one or more filters may be disposed within the air circulation device 303, in the inlet of the electrochemical cell system 306, and/or in the flow housing or flow hood 201. In some embodiments, a filter is used in conjunction with electrodes formed from any catalyst. In still further embodiments, an electrochemical cell apparatus 100, 200, 304 can be made selective to ethylene by using gold catalyst in conjunction with an HSA carbon filter to adsorb hydrogen sulfide.

Example Processes

Having described various embodiments of the electrochemical cell apparatus and system, it should be understood that the electrochemical cell apparatus and/or system may proceed to reduce the concentration of a target gas in an environment in a number of ways.

Figure 9:
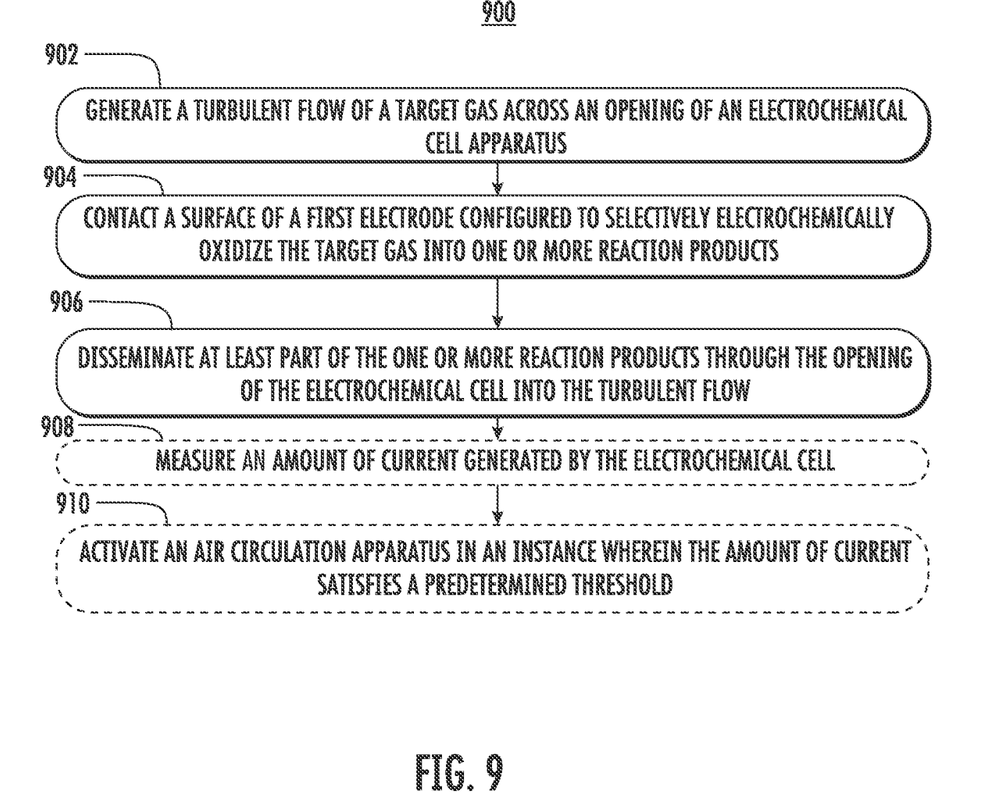
FIG. 9 illustrates a method of reducing the concentration of a target gas in an environment in accordance with various embodiments disclosed herein.

FIG. 9 is a flowchart broadly illustrating a series of steps of method 900 that are performed to reduce the concentration of a target gas in an environment using an electrochemical cell apparatus in accordance with one embodiment of the present disclosure.

In the embodiment illustrated in FIG. 9, method 900 includes, at step 902, generating a turbulent flow of a target gas across an opening of the electrochemical cell, at step 904, contacting a surface of a first electrode of the electrochemical cell with the target gas, wherein the first electrode is configured to selectively electrochemically oxidize the target gas into one or more reaction products; and at step 906, disseminating at least part of the one or more reaction products through the opening of the electrochemical cell into the turbulent flow. At step 908, the method 900 optionally contemplates measuring an amount of current generated by electrochemical cell, and at step 910, activating an air circulation apparatus in an instance wherein the amount of current satisfies a predetermined threshold.

Thus, particular embodiments of the subject matter have been described. While this specification contains many specific implementation details, these should not be construed as limitations on the scope of any inventions or of what may be claimed, but rather as description of features specific to particular embodiments of particular inventions. In addition, while a particular feature may have been disclosed with respect to only one of several implementations, such feature may be combined with one or more other features of the other implementations as may be desired and advantageous for any given or particular application. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

Similarly, while operations are depicted in the drawings in a particular order, this should not be understood as requiring that such operations be performed in the particular order shown or in sequential order, or that all illustrated operations be performed, to achieve desirable results, unless described otherwise. Any operational step shown in broken lines in one or more flow diagrams illustrated herein are optional for purposes of the depicted embodiment.

The following exemplary embodiments are provided, the numbering of which is not to be construed as designating levels of importance.

Embodiment 1 provides an electrochemical cell system configured for reducing the concentration of a target gas in a cold storage environment comprising an electrochemical cell apparatus comprising a housing including a gas aperture, a first electrode and a second electrode disposed within the housing, wherein the apparatus is configured to receive the target gas through the gas aperture, at least partially electrochemically oxidize the target gas upon contact with a surface of the first electrode to form one or more reaction products, and disseminate at least part of the one or more reaction products through the gas aperture, reducing the concentration of the target gas; an air circulation apparatus; and a flow hood, wherein the electrochemical cell apparatus is coupled to the air circulation apparatus via the flow hood, the flow hood defining a flow path for the target gas to flow across the gas aperture of the electrochemical cell apparatus.

Embodiment 2 provides the system of Embodiment 1, wherein the flow hood is configured such that it generates a turbulent flow of the target gas through the flow hood.

Embodiment 3 provides the system according to any one of Embodiments 1 and 2, wherein the flow hood comprises one or more protrusions in the flow path.

Embodiment 4 provides the system according to any one of Embodiments 1 through 3, wherein the electrochemical cell apparatus further comprises a third electrode.

Embodiment 5 provides the system according to Embodiments 4, wherein the electrochemical cell apparatus further comprises a fourth electrode.

Embodiment 6 provides the system according to Embodiment 1, wherein the electrochemical cell apparatus further comprises one or more electrolyte separators disposed between the first electrode and the second electrode.

Embodiment 7 provides the system according to any one of Embodiments 1-6, wherein the first electrode comprises a first gas permeable membrane and a first catalyst mixture, the first electrode positioned within the housing such that the target gas passes through the gas first permeable membrane prior to reaching the first catalyst mixture.

Embodiment 8 provides the system according to any one of Embodiments 1-7, wherein the target gas comprises ethylene, hydrogen sulfide, or combinations thereof.

Embodiment 9 provides the system according to any one of Embodiments 1-8, wherein at least one of the electrodes comprises gold or a gold alloy.

Embodiment 10 provides the system according to any one of Embodiments 1-3, wherein the air circulation apparatus is a fan.

Embodiment 11 provides the system according to any one of Embodiments 1-3, wherein the air circulation apparatus is a pump.

Embodiment 12 provides the system according to any one of Embodiments 1-11, further comprising an electronic circuit configured to measure a current generated by the electrochemical cell apparatus.

Embodiment 13 provides the system according to Embodiment 12, wherein the air circulation apparatus is configured such that it is activated when the current generated by the electrochemical cell apparatus satisfies a predetermined threshold.

Embodiment 14 provides the system according to any one of Embodiments 1-13, wherein the electrochemical cell system further comprises a timer and wherein the air circulation apparatus is configured such that it is activated upon expiration of a defined period of time measured by the timer.

Embodiment 15 provides the system according to Embodiment 1, further comprising a high surface area carbon filter.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An electrochemical cell system configured for reducing a concentration of a target gas in a cold storage environment comprising:
    an electrochemical cell apparatus comprising a housing including a gas aperture, a first electrode and a second electrode disposed within the housing, wherein the electrochemical cell apparatus is configured to receive the target gas through the gas aperture, at least partially electrochemically oxidize the target gas upon contact with a surface of the first electrode to form one or more reaction products, and disseminate at least part of the one or more reaction products through the gas aperture, reducing the concentration of the target gas;
    an air circulation apparatus; and
    a flow hood, wherein the electrochemical cell apparatus is coupled to the air circulation apparatus via the flow hood, the flow hood defining a flow path for the target gas to flow across the gas aperture of the electrochemical cell apparatus.

2. The electrochemical cell system according to claim 1, wherein the flow hood is configured such that it generates a turbulent flow of the target gas through the flow hood.

3. The electrochemical cell system according to claim 1, wherein the flow hood comprises one or more protrusions in the flow path.

4. The electrochemical cell system according to claim 1, wherein the electrochemical cell apparatus further comprises a third electrode.

5. The electrochemical cell system according to claim 4, wherein the electrochemical cell apparatus further comprises a fourth electrode.

6. The electrochemical cell system according to claim 1, wherein the electrochemical cell apparatus further comprises one or more electrolyte separators disposed between the first electrode and the second electrode.

7. The electrochemical cell system according to claim 1, wherein the first electrode comprises a first gas permeable membrane and a first catalyst mixture, the first electrode positioned within the housing such that the target gas passes through the first gas first permeable membrane prior to reaching the first catalyst mixture.

8. The electrochemical cell system according claim 1, wherein the target gas comprises ethylene, hydrogen sulfide, or combinations thereof.

9. The electrochemical cell system according to claim 1, wherein at least one of the first electrode or the second electrode comprises gold or a gold alloy.

10. The electrochemical cell system according to claim 1, wherein the air circulation apparatus is a fan.

11. The electrochemical cell system according to claim 1, wherein the air circulation apparatus is a pump.

12. The electrochemical cell system according claim 1, further comprising an electronic circuit configured to measure a current generated by the electrochemical cell apparatus.

13. The electrochemical cell system according to claim 12, wherein the air circulation apparatus is configured such that it is activated when the current generated by the electrochemical cell apparatus satisfies a predetermined threshold.

14. The electrochemical cell system according to claim 1, further comprising a timer and wherein the air circulation apparatus is configured such that it is activated upon expiration of a defined period of time measured by the timer.

15. The electrochemical cell system according to claim 1, further comprising a high surface area carbon filter.

16. A method for reducing a concentration of a target gas in a cold storage environment using an electrochemical cell apparatus, the method comprising:
    generating a turbulent flow of a target gas across a gas aperture of an electrochemical cell apparatus, the electrochemical cell apparatus comprising a housing including a first electrode and a second electrode disposed within the housing;
    contacting a surface of the first electrode of the electrochemical cell apparatus with the target gas, wherein the first electrode is configured to selectively electrochemically oxidize the target gas into one or more reaction products; and
    disseminating at least part of the one or more reaction products through the gas aperture of the electrochemical cell apparatus into the turbulent flow such that the concentration of the target gas is reduced in the cold storage environment.

17. The method of claim 16, further comprising measuring an amount of current generated by the electrochemical cell apparatus.

18. The method of claim 17, wherein the electrochemical cell apparatus is coupled to an air circulation apparatus via a flow hood, the flow hood defining a flow path for the target gas to flow across the gas aperture of the electrochemical cell apparatus.

19. The method of claim 18, further comprising activating the air circulation apparatus in an instance wherein the measured amount of current generated by the electrochemical cell apparatus satisfies a predetermined threshold.

20. The method of claim 18, wherein the air circulation apparatus is a fan or a pump.

* * * * *